(12) United States Patent
Middleton

(10) Patent No.: US 7,644,546 B2
(45) Date of Patent: Jan. 12, 2010

(54) UTILITY PIPE TAPE FITTED IN PRE-CONSTRUCTION TO PREVENT THE GAPS NEXT TO UTILITY PIPES THAT LET TERMITES IN

(76) Inventor: David Middleton, 15510 Juniper Hollow Way, Cypress, TX (US) 77433

( * ) Notice: Subject to any disclaimer, the term of this patent is extended or adjusted under 35 U.S.C. 154(b) by 473 days.

(21) Appl. No.: 11/389,810

(22) Filed: Mar. 27, 2006

(65) Prior Publication Data

US 2006/0213117 A1 Sep. 28, 2006

Related U.S. Application Data

(60) Provisional application No. 60/665,822, filed on Mar. 28, 2005.

(51) Int. Cl.
*E04B 1/72* (2006.01)
*E04H 9/16* (2006.01)
*A01K 3/00* (2006.01)
(52) U.S. Cl. .......................... 52/101; 52/741.3; 43/107; 43/132.1
(58) Field of Classification Search .............. 428/124, 428/125, 141, 152, 176, 181, 183, 184, 907, 428/424, 167, 179, 182; 52/101, 220.8, 741.3, 52/742.14; 43/132.1, 131, 124, 107, 1, 108, 43/109, 121; 47/32.5
See application file for complete search history.

(56) References Cited

U.S. PATENT DOCUMENTS

| | | | | |
|---|---|---|---|---|
| 3,333,361 A | * | 8/1967 | Manak | 47/58.1 R |
| 3,974,313 A | * | 8/1976 | James | 428/176 |
| 4,143,195 A | * | 3/1979 | Rasmussen | 428/116 |
| D254,506 S | * | 3/1980 | Holmberg | D23/358 |
| 4,397,905 A | * | 8/1983 | Dettmer et al. | 428/180 |
| 4,576,853 A | * | 3/1986 | Vaughn et al. | 428/181 |
| 4,876,134 A | * | 10/1989 | Saitoh et al. | 428/73 |
| 4,935,287 A | * | 6/1990 | Johnson et al. | 428/198 |
| 5,244,716 A | * | 9/1993 | Thornton et al. | 428/198 |
| 5,309,688 A | * | 5/1994 | Robertson | 52/220.8 |
| 5,347,749 A | * | 9/1994 | Chitwood et al. | 43/124 |
| 5,417,017 A | * | 5/1995 | Toutountzis | 52/101 |
| 5,501,912 A | * | 3/1996 | Sergenius | 428/604 |
| 5,763,041 A | * | 6/1998 | Leak et al. | 428/100 |
| 5,871,836 A | * | 2/1999 | Schultink et al. | 428/181 |
| D425,531 S | * | 5/2000 | Largent et al. | D15/147 |
| 6,079,150 A | * | 6/2000 | Setikas et al. | 43/132.1 |
| 6,182,412 B1 | * | 2/2001 | Traxler | 52/517 |
| 6,223,463 B1 | * | 5/2001 | Carlson et al. | 43/108 |
| 6,279,273 B1 | * | 8/2001 | Shingaki | 52/101 |
| 6,296,661 B1 | * | 10/2001 | Davila et al. | 623/1.13 |
| 6,298,610 B2 | * | 10/2001 | Traxler | 52/101 |
| 6,453,628 B2 | * | 9/2002 | Traxler | 52/169.14 |
| 6,602,581 B2 | * | 8/2003 | Aneja | 428/182 |
| 6,685,050 B2 | * | 2/2004 | Schmidt et al. | 221/48 |
| 6,686,023 B2 | * | 2/2004 | Takahashi et al. | 428/141 |
| 6,692,606 B1 | * | 2/2004 | Cederblad et al. | 156/244.11 |
| 6,803,334 B2 | * | 10/2004 | Mizutani et al. | 442/394 |
| 7,387,817 B2 | * | 6/2008 | Becze et al. | 427/282 |

(Continued)

*Primary Examiner*—Richard E Chilcot, Jr.
*Assistant Examiner*—Andrew J Triggs
(74) *Attorney, Agent, or Firm*—John R Casperson

(57) ABSTRACT

Disclosed is a utility pipe tape to act as a termite barrier and a support for a waterproof membrane to prevent gaps from forming between pipe and slab that lets ground termites in through the slab.

18 Claims, 4 Drawing Sheets

U.S. PATENT DOCUMENTS

| | | | |
|---|---|---|---|
| 2002/0162281 A1* | 11/2002 | Nickell et al. | 52/101 |
| 2003/0022584 A1* | 1/2003 | Latimer et al. | 442/414 |
| 2003/0031834 A1* | 2/2003 | Ukegawa et al. | 428/174 |
| 2003/0096548 A1* | 5/2003 | Groitzsch et al. | 442/268 |
| 2003/0167712 A1* | 9/2003 | Robertson | 52/232 |
| 2004/0163332 A1* | 8/2004 | Raymond | 52/101 |
| 2005/0084656 A1* | 4/2005 | Ukegawa et al. | 428/181 |
| 2005/0129725 A1* | 6/2005 | Hino et al. | 424/405 |
| 2006/0213117 A1* | 9/2006 | Middleton | 43/98 |
| 2006/0222773 A1* | 10/2006 | Becze et al. | 427/282 |
| 2006/0270302 A1* | 11/2006 | Ando et al. | 442/328 |
| 2007/0266893 A1* | 11/2007 | So | 106/164.1 |

* cited by examiner

US 7,644,546 B2

UTILITY PIPE TAPE FITTED IN PRE-CONSTRUCTION TO PREVENT THE GAPS NEXT TO UTILITY PIPES THAT LET TERMITES IN

CROSS REFERENCE TO RELATED APPLICATIONS

This application claims the benefit of U.S. Provisional Application No. 60/665,822 filed Mar. 28, 2005, the disclosure of which is herein incorporated by reference.

FIELD OF THE INVENTION

In one aspect, the invention relates to a tape formed from a wire screen or foil. In another aspect, the invention relates to a concrete slab containing the tape. In another aspect, the invention relates to a method for providing a slab with improved resistance to termite penetration.

BACKGROUND OF THE INVENTION

Termites are enormously destructive to homes and other structures worldwide. In the developed countries, many dwellings and other building are erected on concrete slabs, which provides some protection against termite damage. However, termites can and do penetrate small openings in the slab to reach and extensively damage overlying structures.

One of the avenues of termite ingress through slabs are small annular openings which form between the slab and the conduits, typically for water and sewer, which penetrate the slab. It may be impossible to prevent these from occurring. A technique which would prevent termites from taking advantage of these access points would be very desirable.

OBJECTS OF THE INVENTION

An objective of the invention is to provide a system or systems that will prevent termites from accessing and damaging buildings, such as homes, by entry through gaps next to utility pipes or other penetrations, primarily in the slab foundation. The system is a preconstruction solution fitted before a slab foundation is poured, and it is locked into the slab for lifelong protection.

The system's objectives are as follows:

To provide a poison-free termite barrier for the safety of the environment, contractors, inhabitants of the building, their children and pets.

To provide a termite solution that is safe, easy and fast to fit so that there will be no holdups in the construction schedule nor the need for additional, specialized contractors to install the system. All exacting engineering requirements are built into the product in a controlled off-site environment leaving only relatively simple procedures to be carried out on-site.

To provide one product that will fit all outside diameters of utility or other slab penetrations so that installers need only carry one product.

To provide a system design and materials that will stand up to the abuse they might get and will therefore last for the lifetime of any home. Such a system should be durable to normal building site abuse, attack by termites, corrosion, penetration by water, resistance to acids and alkalis etc.

SUMMARY OF THE INVENTION

One embodiment of the invention provides a novel tape formed from metal foil or wire fabric. The tape has a length and a width and a multiplicity of corrugations, pleats or crimps running across its length.

The tape can be employed as part of a termite guard. The termite guard comprises a concrete slab having a top side and a bottom side, a pipe extending through the slab from the bottom side to the top side, and a tubularly shaped band of foil or wire screen surrounding the pipe and embedded in the slab. Preferably the band is constructed of wire screen having a mesh size to exclude termites and a construction to resist destruction by termites. The screen is preferably provided in the form of the tape as above described.

A further embodiment of the invention provides a method for providing a concrete slab with improved resistance to penetration by termites. The method is carried out by providing an area on the earth ready to receive a slab. Such areas are typical in early construction sites. The area has at least one vertically extending pipe which will penetrate the slab from bottom to top, after the slab is poured. A tape of a metal foil or wire screen is wound around the at least one vertically extending pipe at a location to be embedded within the slab after the slab is poured. A clamp is positioned around the wrapped tape to urge the tape tightly against the at least one vertically extending pipe and form a termite barrier held tightly against the pipe which will not be breached by ordinary cracks which may develop between the pipe and the slab. The slab may then be poured in the conventional manner and the resulting combination will be highly resistant to penetration by termites.

DETAILED DESCRIPTION OF THE INVENTION

Figure 1:
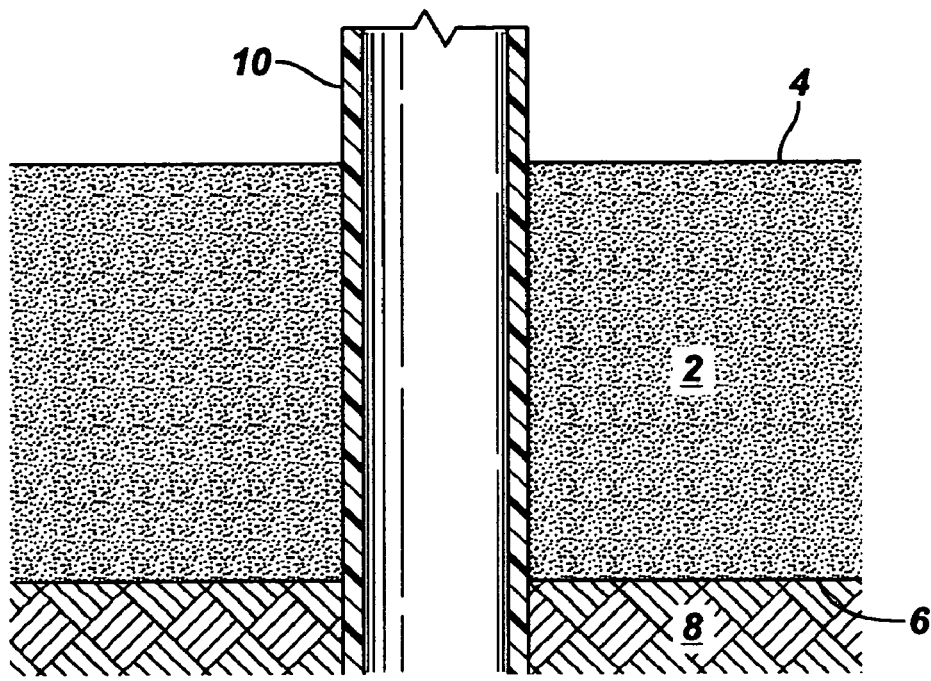
FIG. 1 (prior art) shows a utility pipe or other penetration passing through a concrete slab.

FIG. 1 illustrates an ideal slab penetration according to the prior art. A concrete slab 2 having a top side 4 and a bottom side 6 is positioned on the earth 8. A pipe or other penetration 10 extends through the slab from the bottom side to the top side, with no gap being formed between the pipe and the slab.

Figure 2:
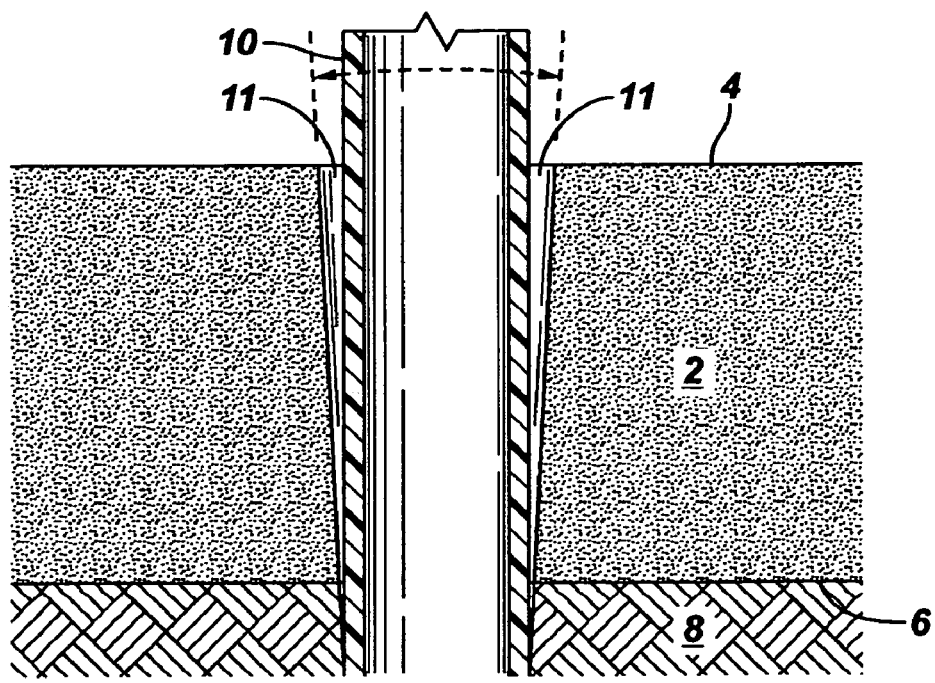
FIG. 2 (prior art) shows gap formation around the sides of a pipe as in FIG. 1.

FIG. 2 illustrates what happens in the prior art when a utility pipe or other penetration is moved before the concrete has cured. This can be done by contractors, people, the wind or by debris carried by it. The gaps 12 created next to the pipe tend to be larger at the top of the slab than the bottom, resulting in a passageway where rain and other water can enter from the top of the slab and create capillary action through holes next to the pipe, effectively washing away sand and cement adjacent to the pipe. After the concrete cure, termites can access a building erected on the slab through the resulting passage.

The invention relates to preventing this termite access path.

With reference to FIGS. 3-6, one embodiment of the invention provides a novel tape 14 formed from metal foil or wire fabric. The tape has a length and a width and a multiplicity of corrugations, pleats or crimps 16 running across its length.

Preferably, in a stretched condition, the tape is at least twice as long as when in an unstretched condition. Although the tape can be provided in a variety of widths, for example, in the range of about 1 to about 6 inches, a width of about 2 inches is expected to provide good results for most applications.

In a preferred embodiment, the tape has a longitudinally-extending flattened or crushed area 18 in the form of a strip. The flattened or crushed area preferably has a width in the range of 10% to 50% of the width of the tape. The tape also preferably has a low memory. A preferred tape may be constructed of stainless steel. Preferably, where stainless steel is used, it has been annealed. Also, preferably, the corrugations, pleats or crimps are formed in a nestable configuration to provide efficient packing in a roll. The corrugations shown are similar to a sine curve because they are preferred for easier, successful crushing and have good packing efficiency. However, other configurations, including zig-zag, concertinas, etc., could be used as well.

Figure 3:
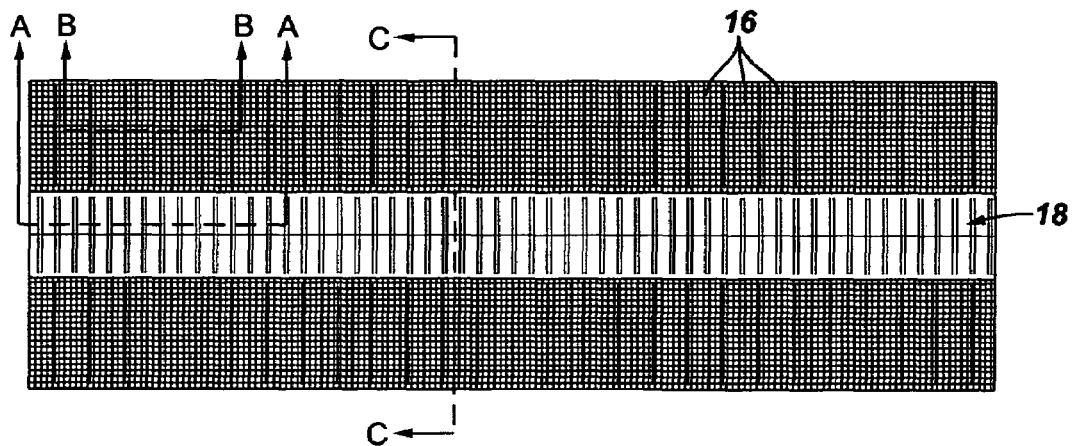
FIG. 3 is a plan view of one embodiment of a termite preventive tape.
Figure 4:
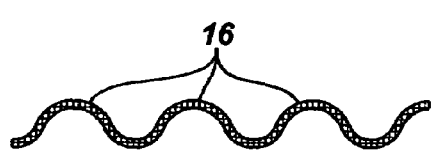
FIG. 4 is a longitudinal sectional view of a portion of the tape as in FIG. 3 along lines B-B.
Figure 5:
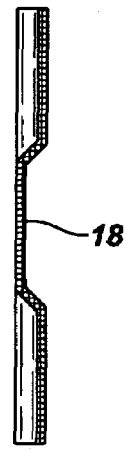
FIG. 5 is a transverse sectional view of the tape as in FIG. 3 along lines C-C.
Figure 6:
FIG. 6 is a longitudinal sectional view of a portion of the tape as in FIG. 3 along lines A-A.

FIG. 3 shows a view of a preferred embodiment of the tape from the top. Somewhere down the middle along its length the pleats or corrugations are crushed flat to accept a clamping mechanism to hold the tape around the utility pipe or other penetration at a height where the concrete will be poured to form the slab. The pleats or corrugations remain intact to either side of the crushed area. The corrugations/pleats have been crushed down in one direction so that the back side of the crushed area is positioned against the utility pipe or other penetration and the front side accepts the clamping mechanism. See FIG. 5.

When the tape is used in conjunction with sealant, according to a preferred embodiment of the invention, a practical upper limit to the size of any residual gaps 22 formed between the tape and the pipe after clamping is about 1/16 inch (about 0.0625 inches, or 1.6 mm). This is the gap resulting from 1/32 inch foil (0.031 inch, 0.8 mm), or wire mesh of 1/64 inch wire (0.016 inch, 0.4 mm), as it is the doubled thickness 20 of the foil or wire mesh which is determinative. Preferably, the minimum dimension of residual gaps 22 is on the order of 1/32 inch or smaller, so as to provide a redundant termite barrier. This is theoretically provided by utilizing foil having a thickness of no more than about 1/64 inch (0.016 inch, 0.4 mm) or wire mesh having a wire thickness of no more than about 1/128 inch (0.008 inch, 0.2 mm) and a mesh size of less than about 12 mesh. Generally speaking, good workability, durability and effectiveness can be found over the range of 0.1 to 0.5 mm foil thickness and screen having a wire diameter in the range of 0.1 to 0.3 mm. Wire mesh having a wire diameter of 0.01 inch, (0.25 mm) has been used with good results and is both durable and easy to handle.

In another embodiment of the invention, there is provided a termite guard 24. See FIG. 10. The termite guard comprises a concrete slab 26 having a top side 28 and a bottom side 30. A penetration such as a pipe 32 extends through the slab from the bottom side to the top side, and a tubularly shaped band of foil or screen 34 surrounds the pipe and embedded in the slab. When the band is in the form of a screen, it has a mesh size preferably to exclude termites and a construction to resist destruction by termites. In a preferred embodiment, the screen is provided in the form of the tape as above described.

Preferably, a circular clamp 36 compresses the tubular screen against the pipe. A screw-type hose clamp, preferably constructed of stainless steel, is expected to provide good results. Because the final product is embedded in the slab, for example, about 2 inches beneath the upper surface of the slab, aesthetics is unimportant, and only a few different sizes of clamps, generally oversized for the application, need be provided on-site.

It is also preferable that at least an upper end of the tubularly shaped screen be formed into a funnel-shaped structure 38 during the installation procedure. This is enabled by the pleated structure, similar to the way in which cupcake liners can open up at the top. A polymeric or resinous substance 40 is then positioned in an annulus formed between the pipe and the upper end of the tubularly shaped screen. The polymeric or resinous substance is preferably selected to be noxious to termites, as well as to be impervious to water and adherent to both the pipe and the screen. Preferably, the lower end of the tubularly shaped screen is formed into a downwardly facing funnel-shaped structure 44 as well.

A further embodiment of the invention provides a method for providing a concrete slab with improved resistance to penetration by termites. The method is carried out by providing an area 42 on the earth ready to receive a slab. Such areas are typical in early construction sites. The area has at least one vertically extending pipe which will penetrate the slab from bottom to top, after the slab is poured. A tape, preferably of wire screen is wound around the at least one vertically extending pipe at a location to be embedded within the slab after the slab is poured. A clamp is positioned around the wrapped tape to urge the tape tightly against the at least one vertically extending pipe and form a termite barrier held tightly against the pipe which will not be breached by ordinary cracks which may develop between the pipe and the slab. The slab may then be poured in the conventional manner.

Figure 7:
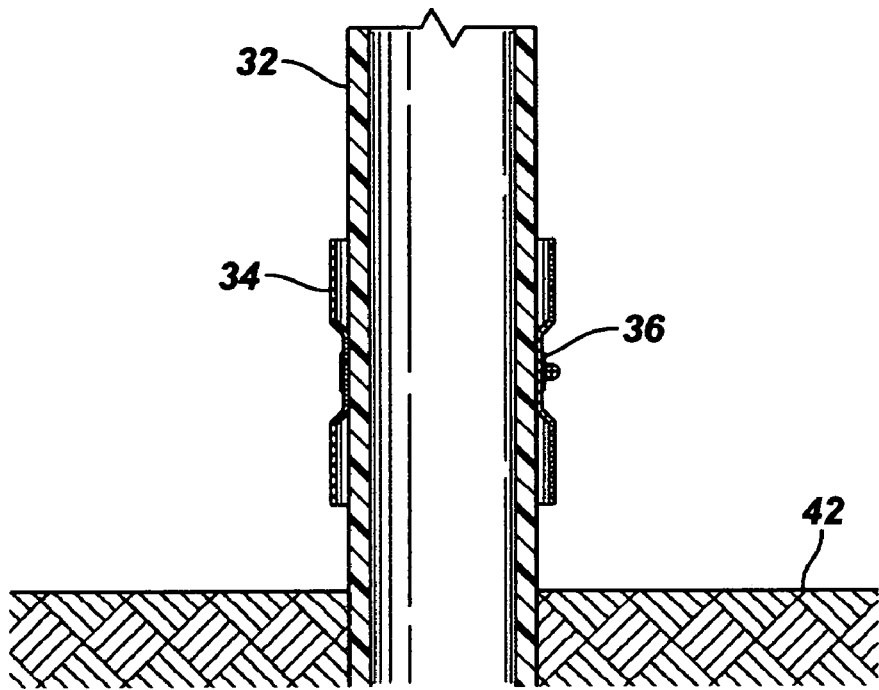
FIG. 7 illustrates in cross section a step in a preferred method of installing the tape.

FIG. 7 shows the tape wrapped around the utility pipe or other penetration, with a small overlap, then attached to the pipe using a clamping device which locks the crushed area to the perimeter of the pipe at a height where the concrete will be poured, locking protection into the foundation.

Figure 8:
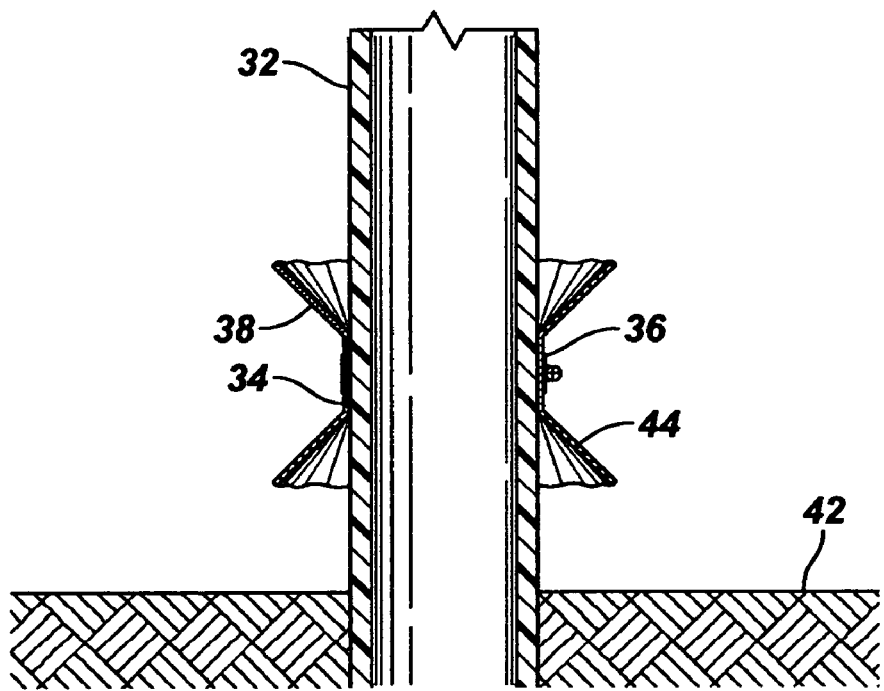
FIG. 8 illustrates in cross section another step in a preferred method of installing the tape.
Figure 9:
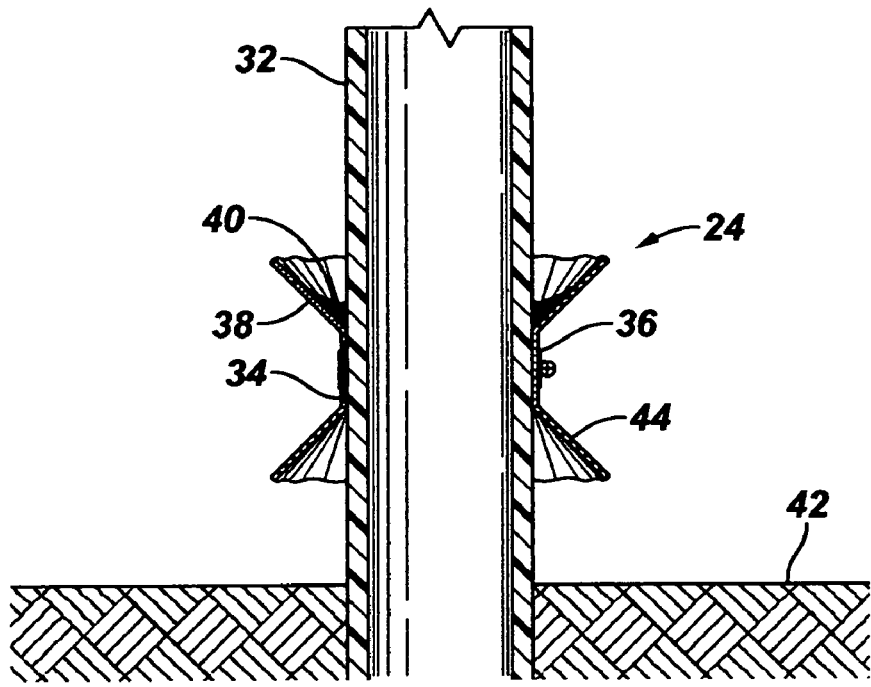
FIG. 9 illustrates in cross section another step in a preferred method of installing the tape.

The tape can be, and preferably is, in the form as described above. An upper end of the wrap is preferably formed into a funnel shaped structure surrounding the at least one pipe. This is preferably at least partially filled with a material noxious to termites prior to pouring the slab. The material is preferably a liquid which hardens or cures to form flexible mass within the cured slab. FIG. 8 shows the tape "flowered out" above and below the clamping mechanism. FIG. 9 shows where the waterproof membrane extends from between the pipe and crushed section of the tape, towards the outer part of the upper "flower."

As indicated above, the tape preferably defines corrugations, pleats, or folds across its length to facilitate flowering the upper end of the wrap. The tape is preferably as hereinabove described.

A prefabricated tape which, when fitted to utility pipe or other penetrations in concrete slab construction, prevents the gaps that allow ground termites to enter and also provides an effective physical barrier against ground termite entry. The tape is fitted to utility and other penetrations before the concrete slab is poured and becomes locked into the concrete for long-term protection. The tape is in the form of a continuous length or coil of metal foil or mesh that is too tough for termites to chew through, is permanently deformable and resists corrosion. Such metals may include stainless steel which resists corrosion but must be annealed to be successfully deformed; aluminum (or its alloys) which can be anodized or coated with ceramic such as that achieved through micro-arc oxidation to achieve corrosion resistance and micro-hardness in excess of hardened steel; or any other metal or alloy displaying the necessary qualities.

The tape is in excess of one inch wide and the foil thickness, or in the case of mesh the wire diameter, is preferably as described above. The tape is corrugated or pleated to a fraction of its original length and such pleats or corrugations are crushed in sufficient width down its length to accept a clamping mechanism to attach it to the utility pipe or other penetration. Such crushing is preferably done in an exacting off-site manufacturing environment rather than on-site. The tape is wrapped around the utility pipe or other penetration and secured in place with a clamping mechanism around the crushed section. The tape simply has to be cut to size for each outer diameter of pipe. The corrugations or pleats are sufficient to allow the portion of the tape above and preferably also below the clamping mechanism to be "flowered out" at an acute angle to the direction of the utility pipe or penetration, the "flowers" facing in opposite directions.

Figure 10:
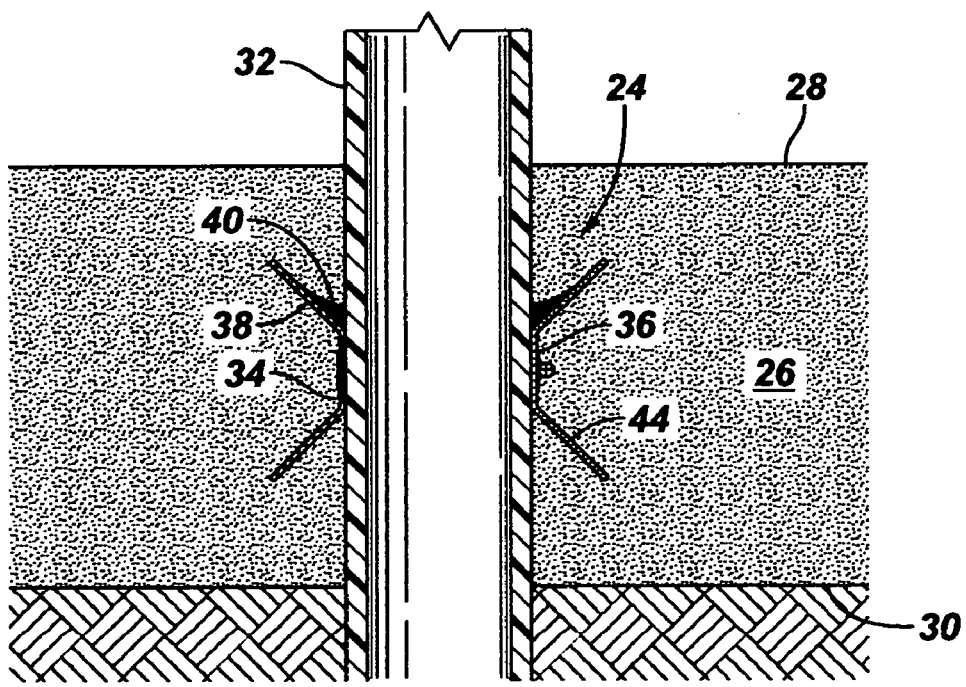
FIG. 10 illustrates, in cross section, another embodiment of the invention.

The upper "flower" supports a continuous waterproof membrane stretching out towards the outer perimeter of the "flower" to where the tape is affixed by a clamping mechanism to the utility or other penetration. Such waterproof membrane is made of suitable flexible, waterproof material termites find distasteful including tar, bituminous material or silicone. DAP (R) Bondex (R) liquid asphalt crack filler has been used with good results. The waterproof membrane may be applied to the tape in a factory environment or on-site or both. FIG. 10 shows the finished barrier set in concrete.

While certain preferred embodiments of the invention have been described herein, the invention is not to be construed as being so limited, except to the extent that such limitations are found in the claims.

What is claimed is:

1. A coil of tape formed from a wire fabric, said tape being too tough for termites to chew through and having a mesh size to exclude termites, said tape having a length, a width in the range of about 1 to 6 inches, and a multiplicity of one of corrugations, pleats and crimps running across its length so that the tape is crushable to accept a clamping mechanism for fitting to a slab penetration.

2. A coil of tape as in claim 1 wherein the tape has a multiplicity of pleats running across its length, and a longitudinally extending crushed area running along its length for accepting a clamp when the tape has been wound around a slab penetration to form a barrier against ground termite entry alongside the slab penetration.

3. A coil of tape as in claim 2 wherein the tape comprises an annealed wire fabric in the form of a screen having a wire diameter of less than about 0.4 mm.

4. A coil of tape as in claim 3 wherein the wire screen is tighter than about 12 mesh and the wire diameter is in the range of 0.1 to 0.3 mm and the wire comprises stainless steel.

5. A tape formed from a material selected from the group consisting of a wire fabric and a metal foil, said tape having a length as measured in a longitudinal direction and a width as measured across the length and a multiplicity of one of corrugations, pleats and crimps running across its length, the length of the tape being greater than its width, said tape having a longitudinally extending strip in which the corrugations, pleat or crimps are crushed to form a flattened area.

6. A tape as in claim 5 wherein the flattened area has a width in the range of 10% to 50% of the width of the tape.

7. A tape as in claim 5 formed from a material which has a low memory.

8. A tape as in claim 5 which is constructed of stainless steel.

9. A tape as in claim 1 formed with a nestable configuration to provide efficient packing in a roll.

10. A termite guard comprising
a. a concrete slab having a top side and a bottom side,
b. a pipe extending through the slab from the bottom side to the top side, and
c. a tubularly shaped coil of tape surrounding the pipe and embedded in the slab, said tape having a construction to resist destruction by termites,
said tape being formed from a material selected from the group consisting of a wire fabric and a metal foil and having a multiplicity of one of corrugations, pleats and crimps running across its length, said tape having a length wrapped circumferentially around the pipe forming a coil and being fitted to the pipe to prevent a gap that would permit the passage of termites.

11. A termite guard comprising
a. a concrete slab having a top side and a bottom side,
b. a pipe extending through the slab from the bottom side to the top side, and
c. a tubularly shaped coil of tape according to claim 1 surrounding the pipe and embedded in the slab, said tape having a construction to resist destruction by termites, wherein the tape is a screen having a mesh size to exclude termites, said guard further comprising
d. a circular clamp compressing the coil tape against the pipe.

12. A termite guard as in claim 11 wherein an upper end of the tubularly shaped screen is formed into a funnel shaped structure.

13. A termite guard as in claim 12 further comprising a polymeric or resinous substance positioned in an annulus formed between the pipe and the upper end of the tubularly shaped screen.

14. A method for providing a concrete slab with improved resistance to penetration by termites, said method comprising
a. providing an area on the earth ready to receive a slab, said area having at least one vertically extending pipe which will penetrate the slab from bottom to top, after the slab is poured,
b. wrapping a tape around said at least one vertically extending pipes at a location to be embedded within the slab after the slab is poured, and
c. positioning a clamp around the wrapped tape to urge the tape tightly against the at least one vertically extending pipe and form a termite barrier held tightly against the pipe which will not be breached by ordinary cracks which may develop between the pipe and the slab, wherein the tape is formed from a material selected from the group consisting of a wire fabric and a metal foil and has a multiplicity of one of corrugations, pleats and crimps running across its length.

15. A method as in claim 14 further comprising
flowering an upper end of the wrapped tape to form a funnel shaped structure surrounding the at least one pipe, and
at least partially filling the funnel shaped structure with a material noxious to termites prior to pouring the slab.

16. A method as in claim 15 wherein the funnel shaped structure is filled with a liquid material which hardens or cures to form flexible mass within the cured slab.

17. A method as in claim 16 wherein the liquid material is a bituminous material.

18. A method as in claim 16 further comprising
flowering a lower end of the wrapped tape to form a second funnel shaped structure surrounding the at least one pipe.

* * * * *